United States Patent
Joo et al.

(10) Patent No.: US 11,915,475 B2
(45) Date of Patent: Feb. 27, 2024

(54) MOVING ROBOT AND TRAVELING METHOD THEREOF IN CORNER AREAS

(71) Applicant: LG ELECTRONICS INC., Seoul (KR)

(72) Inventors: Jinuh Joo, Seoul (KR); Jungsik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 398 days.

(21) Appl. No.: 17/205,227

(22) Filed: Mar. 18, 2021

(65) Prior Publication Data

US 2021/0373570 A1    Dec. 2, 2021

(30) Foreign Application Priority Data

May 26, 2020   (KR) ................. 10-2020-0063230

(51) Int. Cl.
| | | |
|---|---|---|
| G06V 20/10 | (2022.01) | |
| G05D 1/02 | (2020.01) | |
| G05D 1/00 | (2006.01) | |
| H04N 13/239 | (2018.01) | |
| H04N 13/207 | (2018.01) | |
| G06F 18/22 | (2023.01) | |
| H04N 23/56 | (2023.01) | |

(52) U.S. Cl.
CPC ............ *G06V 20/10* (2022.01); *G05D 1/0214* (2013.01); *G05D 1/0251* (2013.01); *G06F 18/22* (2023.01); *H04N 13/207* (2018.05); *H04N 13/239* (2018.05); *H04N 23/56* (2023.01); *G05D 2201/0215* (2013.01)

(58) Field of Classification Search
CPC .. G06V 20/10; G06V 2201/12; G05D 1/0214; G05D 1/0251; G05D 2201/0215; G05D 1/0219; G06F 18/22; H04N 13/207; H04N 13/239; H04N 23/56; H04N 23/57; H04N 5/33; H04N 23/90; G01S 17/931; G01B 11/25; B25J 11/0085; B25J 9/1664; B25J 9/1676; B25J 9/1694; B25J 19/021; A47L 9/2852; A47L 2201/04
See application file for complete search history.

(56) References Cited

U.S. PATENT DOCUMENTS 11,069,082 B1 *  7/2021  Ebrahimi Afrouzi .. H04N 23/56

FOREIGN PATENT DOCUMENTS

KR    10-2019-0134870    12/2019

\* cited by examiner

*Primary Examiner* — Jeff A Burke
*Assistant Examiner* — Sihar A Karwan
(74) *Attorney, Agent, or Firm* — KED & Associates LLP

(57) ABSTRACT

The present disclosure relates to a moving robot that generates image information by accumulating results of sensing a corner area using a 3D camera sensor, and detects an obstacle by extracting an area for identifying the obstacle from the image information, and a traveling method thereof in corner areas.

17 Claims, 9 Drawing Sheets

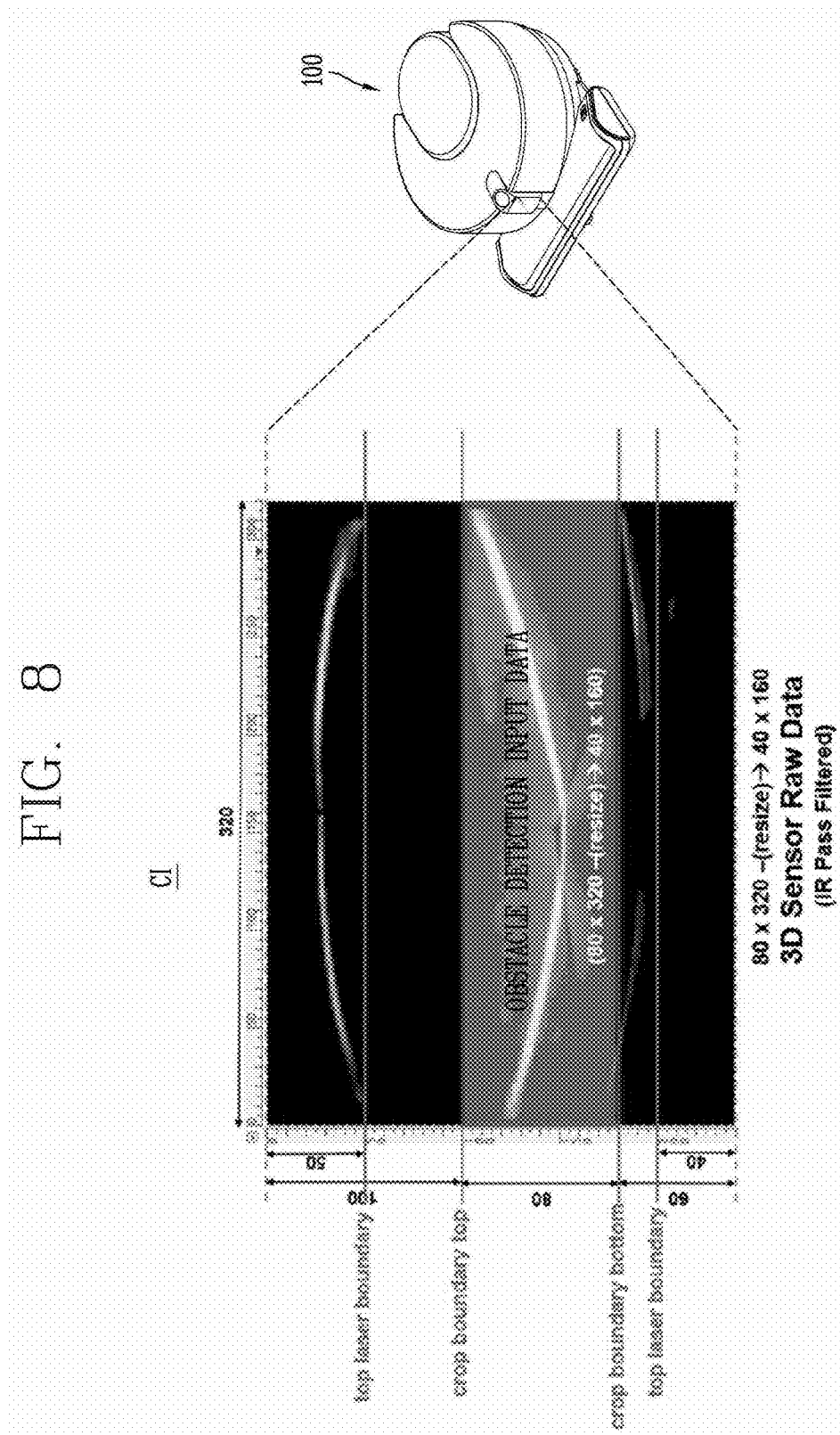

0. DON'T CARE

1. WALL

2. CORNER

3. OBSTACLE

TRANSPARENT OBSTACLE

TRANSPARENT OBSTACLE

MOVING ROBOT AND TRAVELING METHOD THEREOF IN CORNER AREAS

CROSS-REFERENCE TO RELATED APPLICATION

Pursuant to 35 U.S.C. § 119(a), this application claims the benefit of the earlier filing date and the right of priority to Korean Patent Application No. 10-2020-0063230, filed on May 26, 2020, the contents of which is incorporated by reference herein in its entirety.

BACKGROUND

1. Technical Field

The present disclosure relates to a moving robot traveling while cleaning a traveling area and a traveling method thereof in corner areas.

2. Description of the Related Art

In general, robots have been developed for industrial use and have been partially in charge of factory automation. In recent years, the field of applications of robots has been expanded, and home robots that can be used in ordinary homes as well as aerospace robots and medical robots have been made.

A representative example of the home robot is a robot cleaner, which is a type of household appliance that sucks and cleans dust or foreign materials around the robot while autonomously traveling in a predetermined area. Such a robot cleaner is equipped with an obstacle sensor for avoiding obstacles during traveling. Such structure allows the robot cleaner to perform cleaning while traveling by itself.

The robot cleaner employs various traveling (driving) modes corresponding to target cleaning areas exhibiting different environments/characteristics, to clean the target cleaning areas. For example, when traveling along a wall, the robot cleaner performs cleaning in a wall-following traveling mode. In this regard, Korean Laid-Open Patent Publication No. 10-2019-0134870 (published on Dec. 5, 2019) (hereinafter, referred to as Prior Literature) discloses a robot cleaner that travels in corner areas.

However, when moving according to a traveling (driving) mode disclosed in the prior literature, it is difficult to detect an obstacle existing in a corner area due to the nature of the obstacle, and thus, there is a limitation in that it is difficult to travel appropriately according to presence or absence of an obstacle. In particular, there is a high possibility that obstacles such as a desk, a closet, a chest of drawers, and a table where only legs are recognized, or obstacles made of transparent materials such as vases and glass cups exist in the corner area. These obstacles are difficult to be detected and distinguished. The robot cleaner may be likely to keep traveling without detecting the obstacles.

Meanwhile, in the related art, a technology for detecting obstacles using a 3D sensor method has been applied. Specifically, an obstacle detection unit including a light emitter and a light receiver is provided. An obstacle detection is carried out by using at least one of a triangulation method and a TOF method through light emission and light reception of the obstacle detection unit. Since the related art technology detects obstacles using line beams, there is a limitation in that the obstacle detection is incorrectly performed when the shape of an obstacle is difficult to be detected as a line. For example, in the case of a corner area where two walls meet and a plurality of lines is detected, there is a problem that accurate detection of presence or absence of an obstacle is difficult. In addition, there is a high possibility that various types of obstacles are disposed in the corner areas, and thus the identification of the obstacles becomes difficult.

If an obstacle is not accurately detected when traveling in the corner area, there is a risk that the robot cleaner collides with the obstacle and thereby the robot cleaner or the obstacle is damaged. This brings about a problem that the corner area cannot be cleaned smoothly.

SUMMARY

The implementations of the present disclosure are directed to improving those limitations of the related art.

That is, one aspect of the present disclosure is to provide a moving robot capable of preventing erroneous detection of an obstacle and erroneous traveling in corner areas, and a corner (area) traveling method thereof.

Another aspect of the present disclosure is to provide a moving robot capable of performing appropriate traveling depending on obstacles in corner areas, and a corner traveling method thereof.

In order to achieve those aspects and other advantages of the present disclosure, there are provided a moving robot and a traveling method thereof in corner areas, to detect an obstacle using accumulated sensing results of a sensor.

Specifically, image information may be generated by accumulating results of sensing corner areas using a 3D camera sensor and an obstacle may be detected by extracting an area for identifying the obstacle from the image information.

In accordance with implementations of a moving robot and a traveling method thereof in corner areas in order to achieve those aspects and other advantages, identification information may be generated by extracting an area corresponding to a predesignated reference area from image information in which emission results for the corner area are accumulated, presence or absence of an obstacle in the corner area may be detected based on a result of comparing the identification information with prestored reference information, and the main body may be controlled to travel in the corner area according to a result of the detection.

The technical feature as described above may be applied to and implemented in a moving robot, a cleaning robot, a robot cleaner, and a control method thereof, and the present disclosure is to provide implementations of a moving robot and a traveling method thereof in corner areas to achieve the technical feature.

A moving robot according to an implementation to achieve the technical feature of the present disclosure may include a main body, a driving unit configured to move the main body, a sensing unit configured to emit sensing light for detecting whether or not an obstacle exists at the front of the main body so as to generate an emission result, and a control unit configured to detect whether or not an obstacle exists in a traveling environment of the main body based on the emission result of the sensing unit, so as to control the traveling of the main body according to a result of the detection. When controlling the traveling in the corner area within the traveling environment, the control unit may generate identification information by extracting an area corresponding to a predetermined reference area from image information in which the emission results for the corner area are accumulated, detect whether or not the obstacle exists in the corner area based on a result of comparing the identification information with prestored reference information, and control the main body to travel in the corner area according to a result of the detection.

In addition, a method for traveling in a corner area, performed by a moving robot, which may include a main body, a driving unit configured to move the main body, a sensing unit configured to emit sensing light for detecting whether or not an obstacle exists at the front of the main body so as to generate an emission result, and a control unit configured to detect whether or not an obstacle exists in a traveling environment of the main body based on the emission result of the sensing unit, so as to control the traveling of the main body according to a result of the detection, may include generating image information by accumulating the emission results for the corner area, generating identification information by extracting an area corresponding to a pre-designated reference area from the image information, detecting whether or not an obstacle exists in the corner area based on a result of comparing the identification information with prestored reference information, and traveling in the corner area in response to a result of the detection.

According to implementations of a moving robot and a traveling method thereof in corner areas, image information may be generated by accumulating results of sensing a corner area by a 3D camera sensor, and an obstacle may be detected by extracting an area for identifying the obstacle from the image information, thereby improving accuracy of an obstacle detection and traveling in the corner area.

Accordingly, in the implementations of the moving robot and the traveling method thereof in the corner areas, erroneous detection of obstacles and erroneous traveling in the corner areas can be suppressed, and damage/breakdown of the robot due to the erroneous traveling can be prevented.

According to the implementations of the moving robot and the traveling method thereof in the corner areas, appropriate traveling can be performed, responsive to obstacles in the corner areas.

That is, according to the implementations of the moving robot and the traveling method thereof in the corner areas, accuracy, stability and reliability of traveling can be increased.

According to the implementations of the moving robot and the traveling method thereof in the corner areas, utility and efficiency of a 3D camera sensor can be enhanced.

BRIEF DESCRIPTION OF THE DRAWINGS

FIG. 8 is a conceptual view illustrating a concept that a moving robot generates identification information.

DETAILED DESCRIPTION OF THE IMPLEMENTATIONS

Hereinafter, description will be given in detail of implementations disclosed herein. Technical terms used in this specification are merely used for explaining specific implementations, and should not be constructed to limit the scope of the technology disclosed herein.

Figure 1:
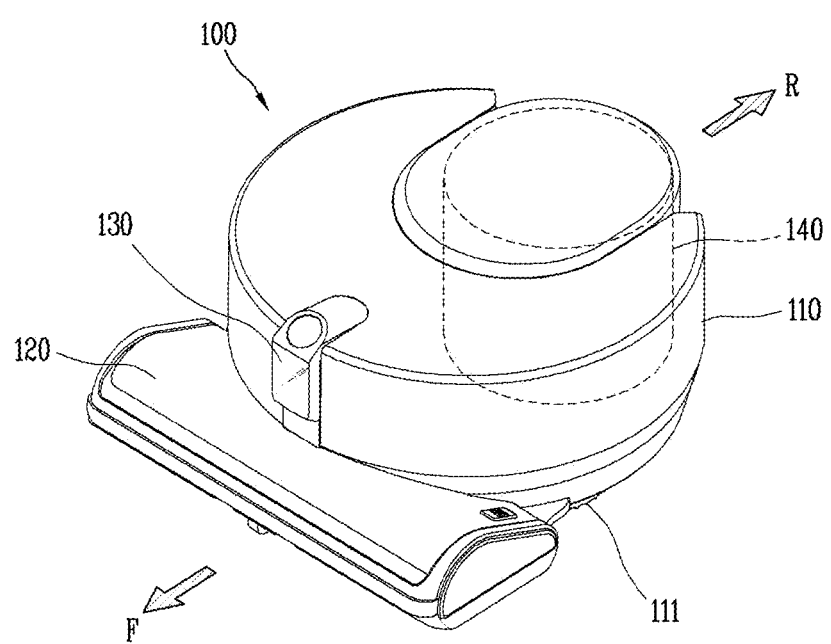
FIG. 1 is a perspective view illustrating an example of a cleaner that performs autonomous traveling.
Figure 2:
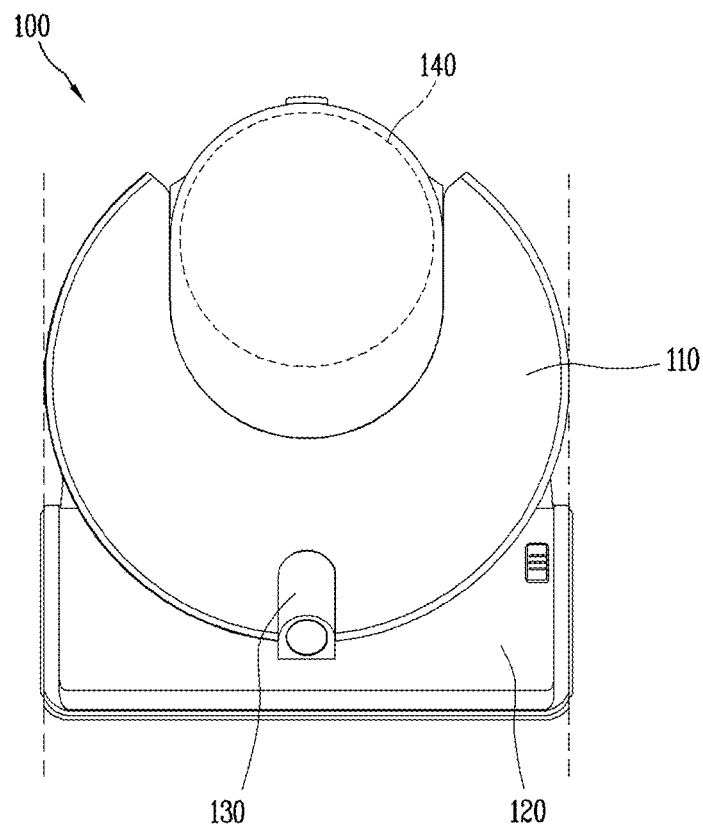
FIG. 2 is a planar view illustrating the cleaner illustrated in FIG. 1 that performs autonomous traveling.
Figure 3:
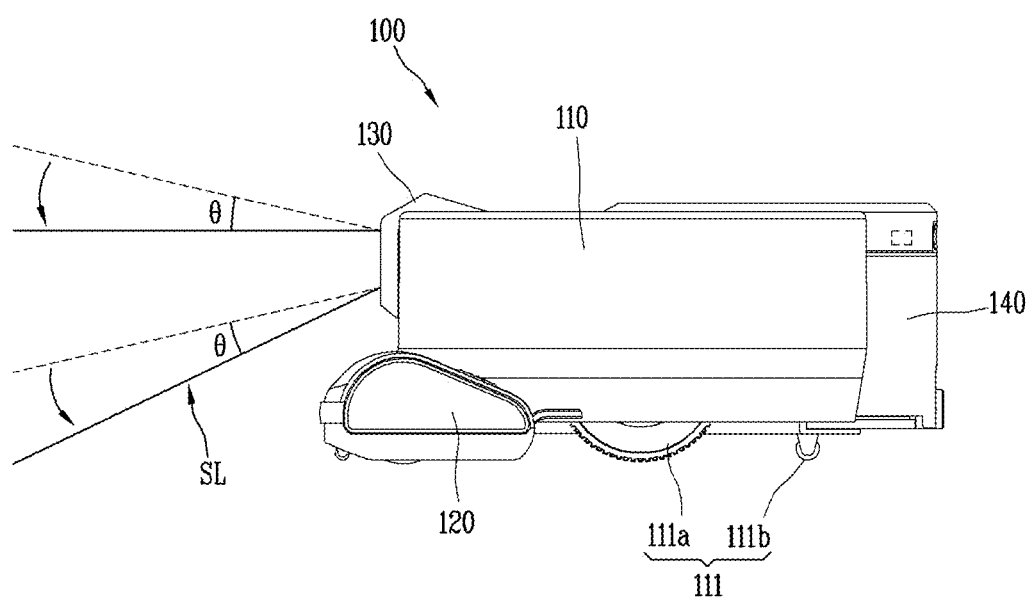
FIG. 3 is a lateral view illustrating the cleaner illustrated in FIG. 1 that performs autonomous traveling.

FIG. 1 is a perspective view illustrating one implementation of a robot cleaner 100, FIG. 2 is a planar view of the robot cleaner 100 illustrated in FIG. 1, and FIG. 3 is a lateral view of the robot cleaner 100 illustrated in FIG. 1.

For reference, in this specification, a moving robot, a robot cleaner, and a cleaner that performs autonomous traveling may be used in the same sense.

Referring to FIGS. 1 to 3, a robot cleaner 100 performs a function of cleaning a floor while traveling on a predetermined area by itself. Cleaning the floor disclosed herein includes sucking dust (including foreign materials) on the floor or mopping the floor.

The robot cleaner 100 includes a cleaner body 110, a suction unit 120, a sensing unit 130, and a dust container 140.

The cleaner body 110 is provided with a control unit (not shown) for the control of the robot cleaner 100 and a wheel unit 111 for the traveling of the robot cleaner 100. The robot cleaner 100 may be moved or rotated forward, backward, left or right by the wheel unit 111.

The wheel unit 111 includes main wheels 111a and a sub wheel 111b.

The main wheels 111a are provided on both sides of the cleaner body 110 and configured to be rotatable in one direction or another direction according to a control signal of the control unit. Each of the main wheels 111a may be configured to be driven independently of each other. For example, each main wheel 111a may be driven by a different motor.

The sub wheel 111b supports the cleaner main body 110 together with the main wheels 111a and assists the traveling of the robot cleaner 100 by the main wheels 111a. The sub wheel 111b may also be provided on a suction unit 120 to be described later.

As described above, the control unit is configured to control the traveling of the wheel unit 111 in such a manner that the robot cleaner 100 autonomously travels on the floor.

Meanwhile, the cleaner main body 110 is provided with a battery (not shown) for supplying power to the robot cleaner 100. The battery 190 may be configured to be rechargeable, and may be detachably disposed in a bottom portion of the cleaner main body 110.

The suction unit 120 is disposed to protrude from one side of the cleaner main body 110 so as to suck air containing dust. The one side may be a side where the cleaner main body 110 travels in a forward direction F, that is, a front side of the cleaner main body 110.

In this drawing, the suction unit 120 is shown having a shape protruding from one side of the cleaner main body 110 to a front side and both left and right sides. Specifically, a front end portion of the suction unit 120 is disposed at a position spaced forward apart from the one side of the cleaner main body 110, and left and right end portions of the suction unit 120 are disposed at positions spaced apart from the one side of the cleaner main body 110 in the right and left directions.

As the cleaner main body 110 is formed in a circular shape and both sides of a rear end portion of the suction unit 120 protrude from the cleaner main body 110 to both left and right sides, empty spaces, namely, gaps may be formed between the cleaner main body 110 and the suction unit 120. The empty spaces are spaces between both left and right end portions of the cleaner main body 110 and both left and right end portions of the suction unit 120 and each has a shape recessed into the robot cleaner 100.

The suction unit 120 may be detachably coupled to the cleaner main body 110. When the suction unit 120 is detached from the cleaner main body 110, a mop module (not shown) may be detachably coupled to the cleaner main body 110 in place of the detached suction unit 120. Accordingly, the user can mount the suction unit 120 on the cleaner main body 110 when the user wishes to remove dust on the floor, and may mount the mop module on the cleaner main body 110 when the user wants to mop the floor.

The cleaner main body 110 is provided with a sensing unit 130. As illustrated, the sensing unit 130 may be disposed on one side of the cleaner main body 110 where the suction unit 120 is located, that is, on a front side of the cleaner main body 110.

The sensing unit 130 may be disposed to overlap the suction unit 120 in an up and down direction of the cleaner main body 110. The sensing unit 130 is disposed at an upper portion of the suction unit 120 so as to detect an obstacle or feature in front of the robot so that the suction unit 120 positioned at the forefront of the robot cleaner 100 does not hit the obstacle.

The sensing unit 130 is configured to additionally perform another sensing function in addition to the sensing function. This will be described in detail later.

The cleaner main body 110 is provided with a dust container accommodating portion. The dust container 140 in which dust separated from the sucked air is collected is detachably coupled to the dust container accommodating portion. As illustrated in the drawing, the dust container accommodation portion 113 may be formed on the other side of the cleaner body 110, namely, behind the cleaner body 110.

A part of the dust container 140 is accommodated in the dust container accommodation portion and another part of the dust container 140 is formed to protrude toward a rear side of the cleaner body 110 (i.e., a reverse direction (R) opposite to a forward direction (F)).

The dust container 140 is provided with an inlet through which air containing dust is introduced and an outlet through which air separated from dust is discharged. The inlet and the outlet communicate with a first opening and a second opening formed through an inner wall of the dust container accommodation portion when the dust container 140 is mounted on the dust container accommodation portion.

According to such connection, air containing dust introduced through the suction unit 120 flows into the dust container 140 through the intake passage inside the cleaner main body 110 and the air is separated from the dust while passing through a filter and cyclone of the dust container 140. Dust is collected in the dust container 140, and air is discharged from the dust container 140 and then exhausted to the outside through a discharge port via an exhaust passage in the cleaner body 110.

Hereinafter, an implementation related to the components of the robot cleaner 100 will be described with reference to FIG. 4.

A robot cleaner 100 or a moving robot according to an implementation of the present disclosure may include at least one of a communication unit 1100, an input unit 1200, a driving unit 1300, a sensing unit 1400, an output unit 1500, a power supply unit 1600, a memory 1700, and a control unit 1800, or a combination thereof.

Figure 4:
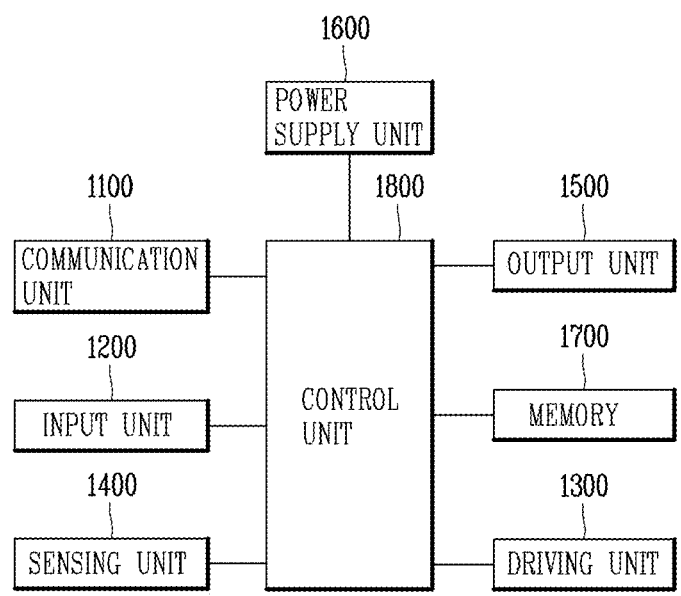
FIG. 4 is a block view illustrating components of a cleaner performing autonomous traveling in accordance with one implementation.

At this time, those components shown in FIG. 4 are not essential, and a robot cleaner having greater or fewer components can be implemented. Hereinafter, each component will be described.

First, the power supply unit 1600 includes a battery that can be charged by an external commercial power supply, and supplies power to the moving robot. The power supply unit 1600 supplies driving power to each of the components included in the moving robot to supply operating power required for the moving robot to travel or perform a specific function.

Here, the control unit 1800 may sense the remaining power of the battery, and control the battery to move power to a charging base connected to the external commercial power source when the remaining power is insufficient, and thus a charge current may be supplied from the charging base to charge the battery. The battery may be connected to a battery sensing portion so that a remaining power level and a charging state can be transmitted to the control unit 1800. The output unit 1500 may display the remaining battery level on a screen under the control of the control unit.

The battery may be located in a bottom portion of a center of the robot cleaner, or may be located in either the left or right side. In the latter case, the moving robot may further include a balance weight to eliminate weight bias of the battery.

The control unit 1800 performs processing of information based on an artificial intelligence (AI) technology and may include one or more modules that perform at least one of learning of information, inference of information, perception of information, and processing of natural language.

The control unit 1800 may use a machine running technology to perform at least one of learning, inferring and processing a large amount of information (big data), such as information stored in the cleaner, environmental information around a mobile terminal, information stored in an external storage capable of performing communication, and the like. The control unit 1800 may control the cleaner to predict (or infer) at least one executable operation and execute an operation having the highest feasibility among the predicted at least one operation, by using the information learned using the machine running technology.

Machine learning technology is a technology that collects and learns a large amount of information based on at least one algorithm, and judges and predicts information based on the learned information. The learning of information is an operation that grasps characteristics, rules, and judgment criteria of information, quantifies relationship between information and information, and predicts new data using a quantified pattern.

The at least one algorithm used by the machine learning technology may be a statistical based algorithm, for example, a decision tree that uses a tree structure type as a prediction model, an artificial neural network copying neural network architecture and functions, genetic programming based on biological evolutionary algorithms, clustering to distribute observed examples into subsets of clusters, Monte Carlo method to compute function values through randomly extracted random numbers from probability, or the like.

As a field of machine learning technology, deep learning is a technique that performs at least one of learning, judging, and processing of information using an Artificial Neural Network (ANN) or a Deep Neuron Network (DNN) algorithm. Such DNN may have an architecture in which layers are connected to transfer data between layers. This deep learning technology may allow learning of a large amount of information through the DNN using a graphic processing unit (GPU) optimized for parallel computing.

The control unit 1800 may use training data stored in an external server or memory, and may include a learning engine mounted to detect characteristics for recognizing a predetermined object. At this time, the characteristics for recognizing the object may include a size, shape and shade of the object.

Specifically, when the control unit 1800 inputs a part of images acquired through the camera provided on the cleaner into the learning engine, the learning engine may recognize at least one object or organism included in the input images.

When the learning engine is applied to traveling of the cleaner, the control unit 1800 can recognize whether or not an obstacle such as a chair leg, a fan, and a specific shape of balcony gap, which obstruct the running of the cleaner, exists around the cleaner. This may result in enhancing efficiency and reliability of the traveling of the cleaner.

On the other hand, the learning engine may be mounted on the control unit 1800 or on an external server. When the learning engine is mounted on an external server, the control unit 1800 may control the communication unit 120 to transmit at least one image to be analyzed, to the external server.

The external server may input the image transmitted from the cleaner into the learning engine and thus recognize at least one object or organism included in the image. In addition, the external server may transmit information related to the recognition result back to the cleaner. In this case, the information related to the recognition result may include information related to the number of objects included in the image to be analyzed and a name of each object.

On the other hand, the driving unit 1300 may include a motor, and operate the motor to bidirectionally rotate left and right main wheels, so that the main body can rotate or move. The driving unit 1300 may advance the main body of the moving robot forward, backward, left, right, curvedly, or in place.

On the other hand, the input unit 1200 receives various control commands for the robot cleaner from the user. The input unit 1200 may include one or more buttons, for example, the input unit 1200 may include an OK button, a setting button, and the like. The OK button is a button for receiving a command for confirming detection information, obstacle information, position information, and map information from the user, and the setting button is a button for receiving a command for setting those information from the user.

In addition, the input unit 1200 may include an input reset button for canceling a previous user input and receiving a new user input, a delete button for deleting a preset user input, a button for setting or changing an operation mode, a button for receiving an input to return to the charging base, and the like.

In addition, the input unit 1200 may be implemented as a hard key, a soft key, a touch pad, or the like and may be disposed on a top of the moving robot. For example, the input unit 1200 may implement a form of a touch screen together with the output unit 1500.

On the other hand, the output unit 1500 may be installed on a top of the moving robot. Of course, the installation position and installation type may vary. For example, the output unit 1500 may display a battery level state, a traveling mode or manner, or the like on a screen.

The output unit 1500 may output internal status information of the moving robot detected by the sensing unit 1400, for example, a current status of each component included in the moving robot. The output unit 1500 may also display external status information detected by the sensing unit 1400, obstacle information, position information, map information, and the like on the screen. The output unit 1500 may be configured as one device of a light emitting diode (LED), a liquid crystal display (LCD), a plasma display panel, and an organic light emitting diode (OLED).

The output unit 1500 may further include an audio output module for audibly outputting information related to an operation of the moving robot executed by the control unit 1800 or an operation result. For example, the output unit 1500 may output a warning sound to the outside in accordance with a warning signal generated by the control unit 1800.

Here, the sound output device may be a device for outputting sound such as a beeper, a speaker, or the like, and the output unit 1500 may output the sound to the outside through the sound output device using audio data or message data having a predetermined pattern stored in the memory 1700.

Accordingly, the moving robot according to one implementation of the present disclosure can output environmental information related to a traveling area through the output unit 1500 or output the same in an audible manner. According to another implementation, the moving robot may transmit map information or environmental information to a terminal device through the communication unit 1100 so that the terminal device outputs a screen to be output through the output unit 1500 or sounds.

On the other hand, the communication unit 1100 is connected to a terminal device and/or another device (also referred to as "home appliance" herein) through one of wired, wireless and satellite communication methods, so as to transmit and receive signals and data.

The communication unit 1100 may transmit and receive data with another device located in a specific area. In this case, the another device may be any device if it can transmit and receive data through a network. For example, the another device may be an air conditioner, a heating device, an air purifier, a lamp, a TV, a vehicle, and the like. The another device may also be a device for controlling a door, a window, a water supply valve, a gas valve, or the like. The another device may also be a sensor for detecting temperature, humidity, air pressure, gas, or the like.

The memory 1700 stores a control program for controlling or driving the robot cleaner and data corresponding thereto. The memory 1700 may store audio information, image information, obstacle information, position information, map information, and the like. Also, the memory 1700 may store information related to a traveling pattern.

The memory 1700 mainly uses a nonvolatile memory. Here, the non-volatile memory (NVM, NVRAM) is a storage device that can continuously store information even when power is not supplied. Examples of the storage device include a ROM, a flash memory, a magnetic computer storage device (e.g., a hard disk, a diskette drive, a magnetic tape), an optical disk drive, a magnetic RAM, a PRAM, and the like.

On the other hand, the sensing unit 1400 may include at least one of an external signal sensor, a front sensor, a cliff sensor, a two-dimensional (2D) camera sensor, and a three-dimensional (3D) camera sensor.

The external signal sensor or external signal detection sensor may sense an external signal of the moving robot. The external signal detection sensor may be, for example, an infrared ray sensor, an ultrasonic sensor, a radio frequency (RF) sensor, or the like.

The moving robot may detect a position and direction of the charging base by receiving a guidance signal generated by the charging base using the external signal sensor. At this time, the charging base may transmit a guidance signal indicating a direction and distance so that the moving robot can return thereto. That is, the moving robot may determine a current position and set a moving direction by receiving a signal transmitted from the charging base, thereby returning to the charging base.

On the other hand, the front sensors or front detection sensors may be installed at a predetermined distance on the front of the moving robot, specifically, along a circumferential surface of a side surface of the moving robot. The front sensor is located on at least one side surface of the moving robot to detect an obstacle in front of the moving robot. The front sensor may detect an object, especially an obstacle, existing in a moving direction of the moving robot and transmit detection information to the control unit 1800. That is, the front sensor may detect protrusions on the moving path of the moving robot, household appliances, furniture, walls, wall corners, and the like, and transmit the information to the control unit 1800.

For example, the frontal sensor may be an infrared ray (IR) sensor, an ultrasonic sensor, an RF sensor, a geomagnetic sensor, or the like, and the moving robot may use one type of sensor as the front sensor or two or more types of sensors if necessary.

An ultrasonic sensor, for example, may generally be used to detect a remote obstacle. The ultrasonic sensor may be provided with a transmitter and a receiver. The control unit 1800 may determine presence or non-presence of an obstacle according to whether ultrasonic waves radiated from the transmitter are reflected by an obstacle or the like and then received by the receiver, and calculate a distance from the obstacle using a ultrasonic wave radiation time and a ultrasonic wave reception time.

Furthermore, the control unit 1800 may compare ultrasonic waves emitted from the transmitter and ultrasonic waves received at the receiver to detect information related to a size of the obstacle. For example, the control unit 1800 may determine that the obstacle is larger in size when more ultrasonic waves are received in the receiver.

In one implementation, a plurality of (for example, five) ultrasonic sensors may be provided along a lateral outer circumferential surface at a front side of the moving robot. At this time, the ultrasonic sensors may preferably be installed on the front surface of the moving robot in a manner that the transmitter and the receiver are alternately arranged.

That is, the transmitters may be disposed at right and left sides with being spaced apart from a front center of the main body or one transmitter or at least two transmitters may be disposed between the receivers so as to form a reception area of an ultrasonic signal reflected from an obstacle or the like. With this arrangement, the reception area can increase while reducing the number of sensors. A radiation angle of ultrasonic waves may be maintained in a range of avoiding an affection to different signals so as to prevent a crosstalk. Also, receiving sensitivity of the receivers may be set differently.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front sensor may include an IR sensor as another sensor, in addition to the ultrasonic sensor.

The IR sensor may be installed on an outer circumferential surface of the moving robot together with the ultrasonic sensor. The infrared sensor may also sense an obstacle existing at the front or the side to transmit obstacle information to the control unit 1800. That is, the IR sensor senses a protrusion, a household fixture, furniture, a wall, a wall edge, and the like, existing on the moving path of the moving robot, and transmits detection information to the control unit 1800. Therefore, the moving robot can move within a specific area without collision with an obstacle.

On the other hand, a cliff sensor (or cliff detection sensor) may detect an obstacle on the floor supporting the main body of the moving robot by mainly using various types of optical sensors.

That is, the cliff sensor may also be installed on a rear surface of the moving robot on the floor, but may be installed on a different position depending on a type of the moving robot. The cliff sensor is located on the rear surface of the moving robot and detects an obstacle on the floor. The cliff sensor may be an IR sensor, an ultrasonic sensor, an RF sensor, a Position Sensitive Detector (PSD) sensor, and the like, which include a transmitter and a receiver, similar to the obstacle detection sensor.

For example, one of the cliff sensors may be installed on the front of the moving robot, and two other cliff sensors may be installed relatively behind.

For example, the cliff sensor may be a PSD sensor, but may alternatively be configured by a plurality of different kinds of sensors.

The PSD sensor detects a short/long distance location of incident light at one p-n junction using semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. The PSD sensor is a type of infrared sensor that uses infrared rays to transmit infrared rays and then measure an angle of infrared rays reflected from and returned back to an obstacle so as to measure a distance. That is, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The control unit 1800 may measure an infrared angle between an emission signal of infrared rays emitted from the cliff detection sensor toward the ground and a reflection signal received by being reflected from the obstacle, to sense a cliff and analyze depth thereof.

Meanwhile, the control unit 1800 may determine whether to pass a cliff or not according to a ground state of the detected cliff by using the cliff detection sensor, and decide whether to pass the cliff or not according to the determination result. For example, the control unit 1800 determines presence or non-presence of a cliff and a depth of the cliff through the cliff sensor, and then allows the moving robot to pass through the cliff only when a reflection signal is detected through the cliff sensor.

As another example, the control unit 1800 may also determine lifting of the moving robot using the cliff sensor.

On the other hand, the two-dimensional camera sensor is provided on one surface of the moving robot to acquire image information related to the surroundings of the main body during movement.

An optical flow sensor converts a lower image input from an image sensor provided in the sensor to generate image data of a predetermined format. The generated image data may be stored in the memory 1700.

Also, at least one light source may be installed adjacent to the optical flow sensor. The at least one light source emits light to a predetermined area of the floor, which is captured by the image sensor. That is, while the moving robot moves in a specific area along the floor surface, a constant distance is maintained between the image sensor and the floor surface when the floor surface is flat. On the other hand, when the moving robot moves on a floor surface which is not flat, the image sensor and the floor surface are spaced apart from each other by a predetermined distance due to an unevenness and an obstacle on the floor surface. At this time, the at least one light source may be controlled by the control unit 1800 to adjust an amount of light to be emitted. The light source may be a light emitting device, for example, a light emitting diode (LED), which is capable of adjusting an amount of light.

The control unit 1800 may detect a position of the moving robot irrespective of slippage of the moving robot, using the optical flow sensor. The control unit 1800 may compare and analyze image data captured by the optical flow sensor according to time to calculate a moving distance and a moving direction, and calculate a position of the moving robot based on the calculated moving distance and moving direction. By using the image information regarding the lower side of the moving robot captured by the optical flow sensor, the control unit 1800 may perform correction that is robust against slippage with respect to the position of the moving robot calculated by another member.

A The three-dimensional (3D) camera sensor may be attached to one surface or a part of the main body of the moving robot to generate 3D coordinate information related to surroundings of the main body.

That is, the 3D camera sensor may be a 3D depth camera that calculates a remote/near distance between the moving robot and an object to be captured.

Specifically, the 3D camera sensor may capture 2D images related to surroundings of the main body, and generate a plurality of 3D coordinate information corresponding to the captured 2D images.

In one implementation, the three-dimensional camera sensor may include two or more cameras that acquire a conventional two-dimensional image, and may be formed in a stereo vision manner to combine two or more images obtained from the two or more cameras so as to generate three-dimensional coordinate information.

Specifically, the three-dimensional camera sensor according to the implementation may include a first pattern emission unit for emitting (irradiating) light with a first pattern in a downward direction toward the front of the main body, and a second pattern emission unit for emitting light with a second pattern in an upward direction toward the front of the main body, and an image acquisition unit for acquiring an image in front of the main body. Thus, the image acquiring portion may acquire an image of an area where the light of the first pattern and the light of the second pattern are incident.

In another implementation, the three-dimensional camera sensor may include an infrared ray pattern emission unit for emitting (irradiating) an infrared ray pattern together with a single camera, and capture the shape of the infrared ray pattern emitted from the infrared ray pattern emission unit onto the object to be captured, thereby measuring a distance between the sensor and the object to be captured. Such a three-dimensional camera sensor may be an IR (infrared) type three-dimensional camera sensor.

In still another implementation, the three-dimensional camera sensor may include a light emitting unit (or light emitter) that emits light together with a single camera, receive a part of laser emitted from the light emitting unit reflected from the object to be captured, and analyze the received laser, thereby measuring a distance between the three-dimensional camera sensor and the object to be captured. The 3D camera sensor may be a time-of-flight (TOF) type 3D camera sensor.

Specifically, the laser of the 3D camera sensor is configured to emit (emit) a laser beam extending in at least one direction. In one example, the 3D camera sensor may be provided with first and second lasers. The first laser emits linear laser beams intersecting each other, and the second laser emits single linear laser beam. According to this, the lowermost laser is used to detect an obstacle on a bottom, the uppermost laser is used to detect an obstacle on a top, and an intermediate laser between the lowermost laser and the uppermost laser is used to detect an obstacle at a middle portion.

Hereinafter, an implementation illustrating an installation aspect of a cleaner 100 and a charging station 510 in a traveling environment 500 corresponding to a traveling area will be described with reference to FIG. 5.

Figure 5:
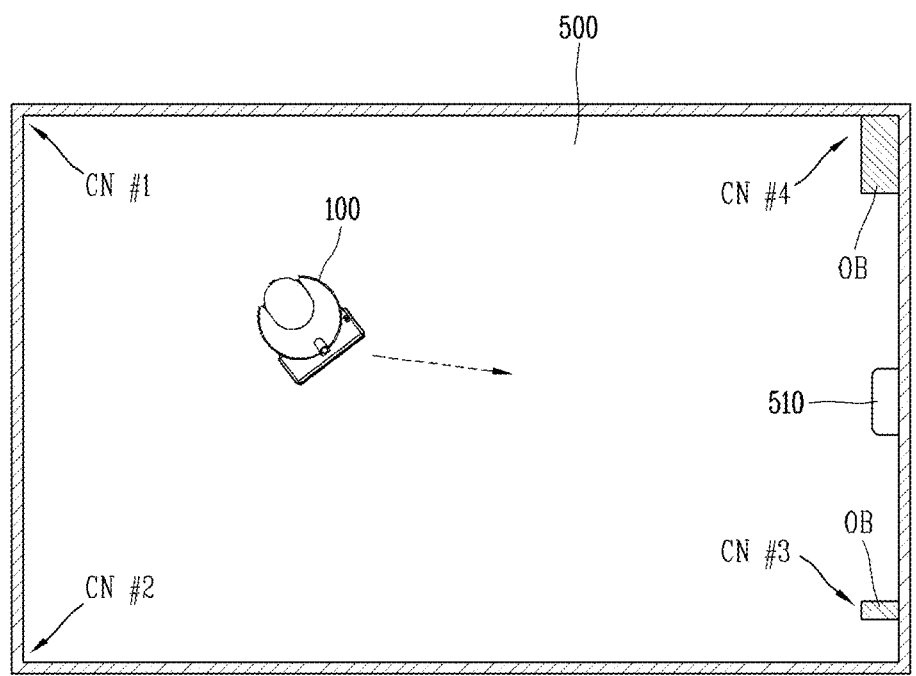
FIG. 5 is a conceptual view illustrating an example in which a cleaner and a charging station are installed in a cleaning area.

As illustrated in FIG. 5, the charging station 510 for charging a battery of the cleaner 100 may be installed in a traveling environment 500. In one implementation, the charging station 510 may be installed at an outer edge of the traveling environment 500.

Although not shown in FIG. 5, the charging station 510 may include a communication device (not shown) capable of emitting different types of signals, and the communication device may perform wireless communication with the communication unit 1100 of the cleaner 100.

The control unit 1800 may control the driving unit 1300 such that the main body of the cleaner 100 is docked to the charging station 510 based on a signal received at the communication unit 1100 from the charging station 510.

The control unit 1800 may move the main body in a direction toward the charging station 510 when a remaining battery capacity falls below a limit capacity, and control the driving unit 1300 to start a docking function when the main body is close to the charging station 510.

Meanwhile, in the traveling environment 500 as illustrated in FIG. 5, at least one corner area CN (e.g., CN #1 to CN #4) may exist. The corner area CN may have restrictions in traveling and cleaning in terms of the fact that two wall surfaces intersect with each other and there is a probability of a high degree of contamination. Thus, specific traveling and cleaning may be required.

In particular, as illustrated in FIG. 5, when obstacles OB exist in some (e.g., CN #3 and CN #4) of the corner areas CN, there is a probability that the obstacles OB are incorrectly recognized and a traveling motion is obstructed due to environmental characteristics of the corner areas. This may cause the corner areas to be improperly cleaned.

Therefore, the moving robot is needed to travel in a specific manner in the corner areas CN having the obstacles OB.

Hereinafter, one implementation of a moving robot according to the present disclosure will be described.

A moving robot 100 (hereinafter, referred to as a robot) according to the present disclosure may include a main body 110, a driving unit (or wheel unit) 111 configured to move the main body 110, a sensing unit 130 configured to generate emission results by emitting sensing light SL for detecting (sensing) whether or not an obstacle is present at the front of the main body 110, and a control unit 1800 configured to sense whether or not an obstacle is present in a traveling environment of the main body 110 based on the emission result of the sensing unit 130 and control the traveling of the main body 110 according to the sensing result.

Figure 6:
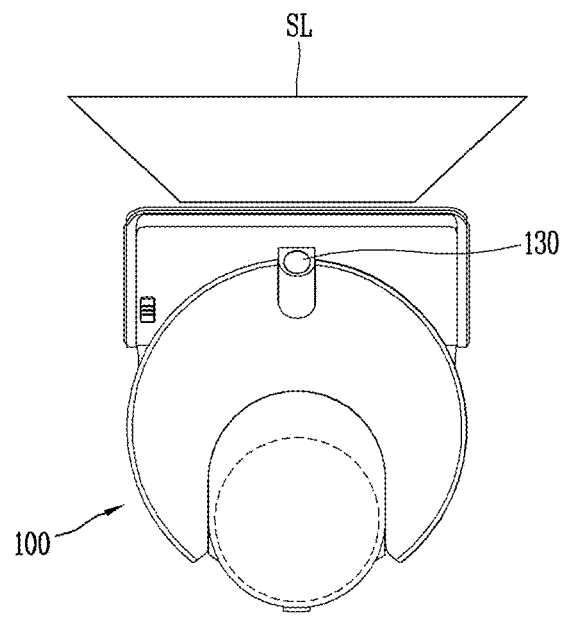
FIG. 6 is an exemplary view illustrating an implementation of a moving robot.

In this way, the robot 100 including the main body 110, the driving unit 111, the sensing unit 130, and the control unit 1800, as illustrated in FIG. 6, may be configured such that the sensing unit 130 emits the sensing light SL and the control unit 1800 senses an obstacle existing in front of the robot 100 according to a result of the emission of the sensing light SL.

Here, the sensing light SL may be laser beam emitted from the sensing unit 130, and may be emitted in a linear form.

The sensing unit 130, as illustrated in FIG. 3, may emit the sensing light SL to the front of the main body 110 while the main body 110 is traveling. Thus, the sensing light SL may be emitted onto an obstacle existing at the front of the main body 110.

Accordingly, the control unit 1800 may detect presence or absence of an obstacle based on a result of the emission of the sensing unit 130.

Specifically, when the sensing unit 130 emits the sensing light SL to the front of the main body 110 to generate an emission result while the main body 110 is moving forward, the control unit 130 may generate 3D image information using the emission results for a predetermined period of time, and detect whether an obstacle exists in an area to which the sensing light SL has been emitted based on the 3D image information.

In this way, the sensing unit 130 that generates the emission result by emitting the sensing light SL may include a 3D camera sensor to emit the sensing light SL to the front of the main body 110, as illustrated in FIG. 3.

That is, the sensing unit 130 may emit the sensing light SL to the front of the main body 110 through the 3D camera sensor.

The 3D camera sensor may be provided to face the ground in front of the main body to emit the sensing light SL onto the ground.

For example, as illustrated in FIG. 3, in a state where the 3D camera sensor is oriented horizontally with respect to the ground, it may be tilted toward the ground by a predetermined angle θ to emit the sensing light SL onto the ground.

The 3D camera sensor may emit the sensing light SL onto the ground in the form of line beam.

For example, the sensing light SL may be emitted onto a floor (or floor surface) in the form of line beam.

Accordingly, while the main body 110 is moving forward, the sensing light SL may be emitted in the form of scanning the floor.

In this case, the sensing light SL may be emitted by an area corresponding to the product of a distance moved by the main body 110 and a length of the sensing light SL.

The 3D camera sensor may emit the sensing light SL on the floor spaced apart from the main body 110 by a predetermined distance.

For example, the 3D camera sensor may emit the sensing light SL onto the floor spaced apart from the main body 110 by a distance that is determined by an angle at which the sensor faces the floor.

The 3D camera sensor may emit the sensing light SL in a predetermined range of the floor.

For example, the 3D camera sensor may emit the sensing light SL of a predetermined length onto the floor in a linear shape. Here, the sensing light SL may be emitted in a predetermined range corresponding to an emitted area of the sensing light SL.

The sensing unit 130 may generate the emission result every preset sensing period and transmit it to the control unit 1800.

That is, the sensing period may be a unit time for which the emission result is generated.

The sensing period may be set to a time in the range of 20 to 40 ms.

For example, the sensing period may be set to 30 ms. Therefore, the sensing unit 130 may generate the emission result every 30 ms and transmit it to the control unit 1800.

Accordingly, the control unit 1800 may generate 3D image information by accumulating the emission results generated per 30 ms.

In this way, the sensing unit 130 may generate the emission result at each preset sensing period and transmit it to the control unit 1800, so that the control unit 1800 can precisely generate the 3D image information.

The control unit 1800 may generate the 3D image information based on the emission result, detect whether there is an obstacle OB in the traveling environment 500 according to the 3D image information, and control the traveling of the main body 110 according to a result of the detection.

The control unit 1800 may include a recognition part (not shown) that recognizes an obstacle OB by analyzing the 3D image information, and may detect the obstacle OB through the recognition part.

The recognition part is a memory for storing data and may be included in the control unit 1800.

The recognition part may store an artificial neural network based recognition model learned by a deep learning algorithm or a machine learning algorithm, and recognize an obstacle OB from the 3D image information through the recognition model.

Meanwhile, the control unit 1800 may control the main body 110 to travel in the corner area CN in a different manner from traveling in a general area of the traveling environment 500.

When controlling the traveling in the corner area CN, the control unit 1800 may extract an area corresponding to a predetermined reference area from image information in which emission results with respect to the corner area CN are accumulated, to generate identification information. The control unit 1800 may then sense whether or not an obstacle OB exists in the corner area CN based on a comparison result between the identification information and prestored reference information, and control the main body 110 to travel in the corner area CN according to the sensing result.

When controlling the traveling in the corner area CN, the control unit 1800 may control the main body 110 to travel in the corner area CN according to a preset traveling mode.

That is, the robot 100 may travel in the corner area CN according to the traveling mode.

The traveling mode may be a mode for cleaning the corner area CN during traveling.

The traveling mode may be set differently from a mode of traveling in a general area excluding the corner area CN in the traveling environment 500.

For example, the traveling mode may be set such that a specific motion is carried out in a predetermined order in the corner area CN, or may be set such that intensity and frequency of cleaning are different from those in the mode of traveling in the general area excluding the corner area CN.

The traveling mode may be a mode in which the main body 110 travels at one wall of the corner area CN by sequentially performing a reverse motion, a turning motion, a curved motion, and a forward motion.

Accordingly, when controlling the traveling of the main body 110 according to the traveling mode, the control unit 1800 may control the main body 110 to travel at the one wall of the corner area CN sequentially by the reverse motion, the turning motion, the curved motion, and the forward motion.

Figure 7:
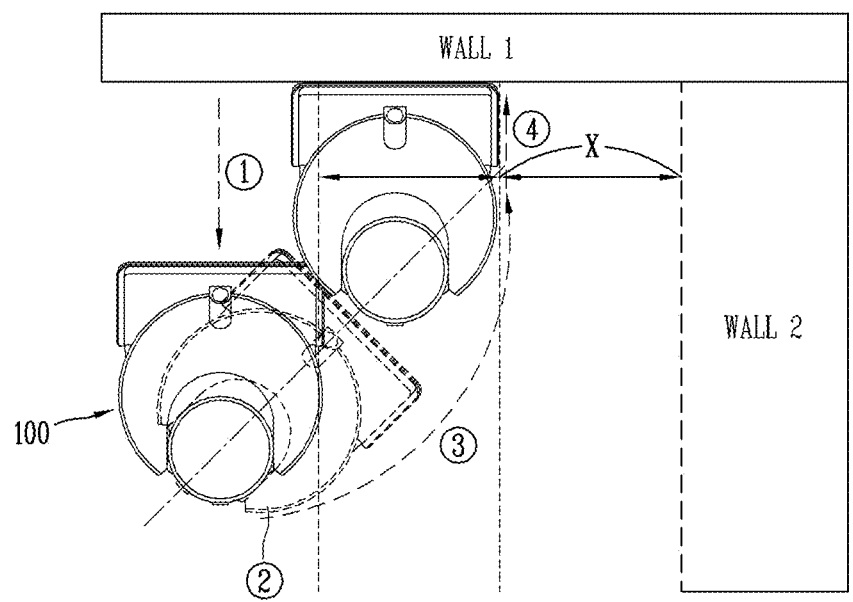
FIG. 7 is an exemplary view illustrating an example in which a moving robot travels in a corner area.

That is, when traveling in the corner area CN, as illustrated in FIG. 7, the robot 100 may travel reversely (①), turn (②), travel curvedly (③) and travel forward (④) in a sequential manner at one wall WALL 1 of the corner area CN.

The control unit 1800 may control the main body 110 to repeat the traveling pattern according to the traveling mode until the traveling in the corner area CN is completed.

That is, the control unit 1800 may control the main body 110 to sequentially perform the reverse motion (①), the turn (②), the curved motion (③) and the forward motion (④) until the robot 100 arrives at another wall WALL 2 from the one wall WALL 1.

In this case, the robot 100 may repeat the traveling according to the traveling mode to move along the one wall WALL1 at a predetermined interval (X cm) toward the another wall WALL 2.

The control unit 1800 may generate the identification information while the main body 110 performs the turn (②) and the curved motion (③), and sense whether or not an obstacle OB exists in the corner area CN based on a result of comparing the identification information with the reference information.

That is, while the main body 110 performs the turn (②) and the curved motion (③) after moving reversely (①) from a pre-traveled one point in order to move from the one point toward the another wall WALL 2 by the distance (X cm), the control unit 1800 may generate the identification information related to a target point to which the main body is to move, and compare the generated identification information with the reference information, so as to sense an obstacle OB located at the target point.

When the control unit 1800 detects an obstacle OB on the corner area CN, the control unit 1800 may control the main body 110 to switch a traveling direction to a direction before performing the turning motion (②) and travel forward to the one wall WALL 1.

When the obstacle OB is detected while the main body 110 is traveling by performing the curved motion (③), the control unit 1800 may control the main body 110 to switch the traveling direction to a direction toward the one wall WALL 1 at a position where the obstacle OB has been detected, and travel forward to the one wall WALL 1.

Accordingly, the main body 110 may keep traveling according to the traveling mode by avoiding the obstacle OB without colliding with the obstacle OB.

The control unit 1800 may detect whether or not the obstacle OB exists in the corner area CN based on a result of accumulating emission results of the sensing unit 120 according to a predetermined criterion.

The control unit 1800 may accumulate the emission results according to the predetermined criterion, generate the image information CI as illustrated in FIG. 8, and detect the presence or absence of the obstacle OB on the corner area CN based on the image information CI.

That is, the control unit 1800 may generate the image information CI by accumulating the emission results with respect to the corner area CN according to the predetermined criterion, and detect the presence or absence of the obstacle OB by extracting an area corresponding to the reference area from the image information CI.

The predetermined criterion may be a criterion of image information CI for identifying information on the corner area CN.

For example, the predetermined criterion may be a criterion for a volume of the image information CI, an emission time of the sensing unit 120, or an amount of data required for the emission result.

Accordingly, the control unit 1800 may generate the image information CI with a predetermined volume, as illustrated in FIG. 8, and detect whether the obstacle OB is present using the image information CI.

The image information CI may be generated in a predetermined size (volume) or larger by accumulating the emission results according to the predetermined criterion.

For example, as illustrated in FIG. 8, the image information may be generated in a size of 240×320 pixels.

The control unit 1800 may generate the identification information by extracting an area corresponding to the reference area from the image information CI as illustrated in FIG. 8, compare the identification information with the reference information, and detect the presence or absence of the obstacle OB based on the comparison result.

That is, the control unit 1800 may identify the obstacle OB based on a partial area corresponding to the reference area in the image information CI, and determine whether the obstacle OB is present on the corner area CN.

The reference area may be an area with predetermined upper and lower lengths from one point of the image information CI.

That is, the reference area may correspond to a part of the image information CI.

For example, as illustrated in FIG. 8, the reference area may be an area corresponding to a lower portion based on the vertical center of the image information CI.

Here, the one point may be a point at which the sensing light is gathered at a ratio equal to or higher than a predetermined reference.

That is, the reference area may be an area with predetermined lower and upper lengths from a point of the image information CI, at which a ratio that the sensing light is gathered is equal to or higher than a predetermined reference.

For example, as illustrated in FIG. 8, the reference area may be an area corresponding to a length of 80 pixels in a vertical direction including the vertical center of the image information CI.

In this case, the reference area may be an area in a size having 80 pixels in the vertical direction and 320 pixels in the horizontal direction (i.e., 80×320 pixels) in a part of the image information CI.

The control unit 1800 may extract the area corresponding to the reference area from the image information CI and generate the identification information by reducing the size of the extracted result according to a predetermined ratio.

For example, the identification information may be generated by reducing the size of the reference area by 0.5 ratio.

In this case, when the size of the reference region is 80×320 pixels, the reference area may be reduced by the 0.5 ratio to generate the identification information in a size of 40×160 pixels.

Accordingly, the volume of data for identifying the obstacle OB may be reduced, which may increase a speed of identifying and detecting the obstacle OB.

After generating the identification information, the control unit 1800 may compare the identification information with the prestored reference information, and determine (detect) whether the obstacle OB is present based on the comparison result.

The reference information may be information in the form of an image compared with the identification information.

Accordingly, the control unit 1800 may compare the identification information with the reference information, and determine whether the obstacle OB is present based on whether the identification information matches the reference information.

The reference information may include at least one pattern information related to topography, feature, and type of the obstacle OB in the corner area CN.

For example, as illustrated in FIGS. 9A to 9H, the reference information may include pattern information related to each of the topography, feature, and type of the obstacle OB in the corner area CN.

Figure 9A:
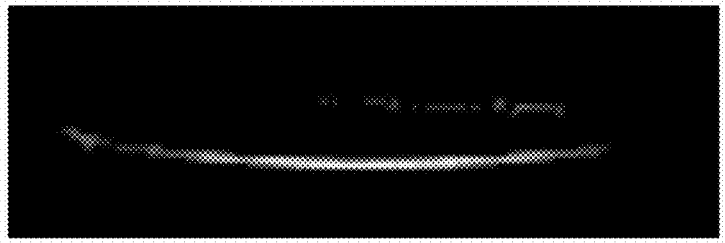
FIGS. 9A to 9H are exemplary views illustrating reference information of a moving robot.
Figure 9B:
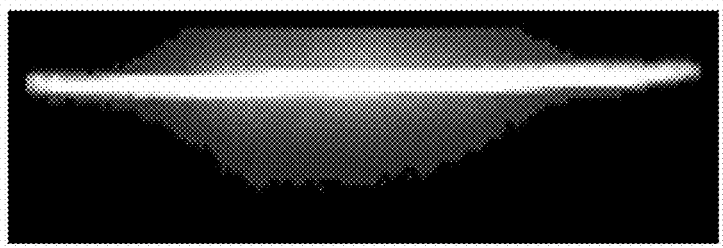
Figure 9C:
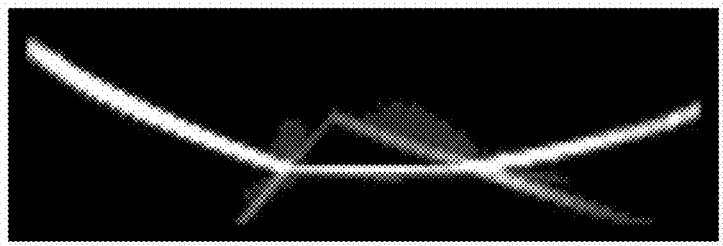
Figure 9D:
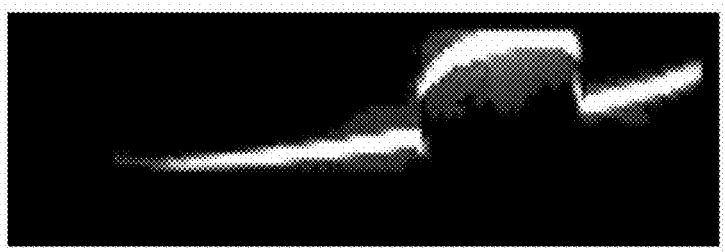
Figure 9E:
Figure 9F:
Figure 9G:
Figure 9H:

Here, FIG. 9A illustrates a pattern when an obstacle does not exist in the corner area CN, FIG. 9B illustrates a pattern of one wall in the corner area CN, FIG. 9C illustrates a pattern of a portion where two walls meet in the corner area CN, FIG. 9D illustrates a pattern when an obstacle OB exists in the corner area CN, and FIGS. 9E to 9H illustrate various patterns when transparent obstacles OB exist in the corner area CN.

In addition, the reference information may include at least one pattern information according to each type of obstacles OB.

The control unit 1800 may compare the identification information with the reference information and detect whether an obstacle OB is present according to a pattern corresponding to the identification information in the reference information.

For example, when the identification information corresponds to the pattern as illustrated in FIG. 9C, the control unit 1800 may detect absence of an obstacle OB. On the other hand, when the identification information corresponds to the pattern as illustrated in FIG. 9D, the control unit 1800 may detect presence of an obstacle OB.

The control unit 1800 may compare the identification information with the reference information, and detect the topography, feature, and type of an obstacle OB in the corner area CN.

For example, depending on a pattern that the identification information matches among the patterns included in the reference information, the control unit 1800 may determine whether the obstacle OB is a transparent type or an opaque type.

The control unit 1800 may reflect a result of detecting whether the obstacle OB is present in the corner area CN to the reference information, and store the reference information.

Accordingly, the result of detecting whether the obstacle OB is present may be learned.

The control unit 1800 may detect presence or absence of an obstacle OB as described above, and control the main body 110 to travel in the corner area CN according to a result of the detection.

That is, the control unit 1800 may control the execution of the traveling mode according to the result of the detection.

Figure 10:
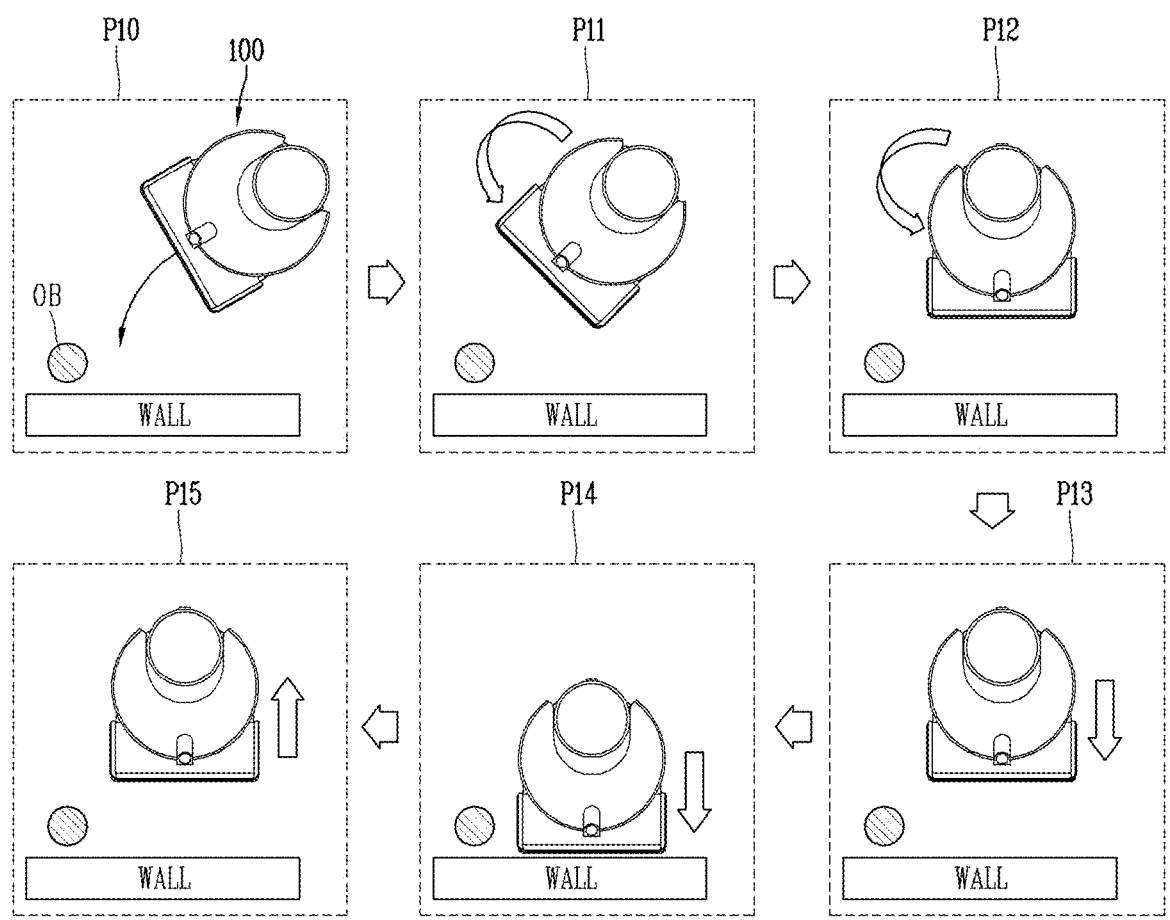
FIG. 10 is an exemplary view illustrating traveling of a moving robot in response to detection of an obstacle.

An example in which the robot 100 travels in the corner area CN according to the result of the detection may be as illustrated in FIG. 10.

As illustrated in FIG. 10, while the robot 100 moves backward (①) from one wall WALL, turns (②) by a predetermined angle, and curvedly moves (③) (P10), the control unit 1800 may generate identification information to compare with reference information. When presence of an obstacle OB is detected according to a result of the comparison, the control unit 1800 may control the main body 110 to turn to a direction before performing the turning motion (②) (P11 and P12), move forward in a direction toward the one wall WALL (P13 and P14), and then move backward from the wall WALL (P15). Accordingly, the main body 110 may completely travel in the corner area CN without a collision with the obstacle OB.

Figure 11:
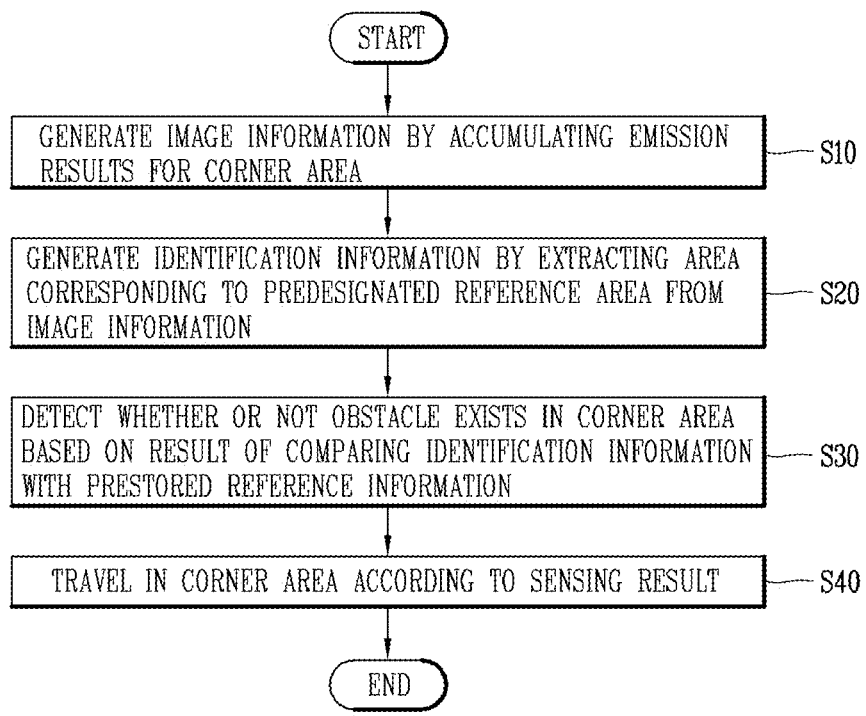
FIG. 11 is a flowchart illustrating a method in which a moving robot travels in a corner area.

In this way, the robot 100 that generates the identification information by extracting an area corresponding to a reference area from image information CI in which emission results for the corner area CN are accumulated, detects the presence or absence of the obstacle OB in the corner area CN based on the comparison result between the identification information and the prestored reference information, and travels in the corner area CN according to the detection result may travel in the corner area according to a traveling method in a corner area illustrated in FIG. 11.

A traveling method in a corner area (hereinafter, referred to as a traveling method) is a method in which the robot 100 travels in the corner area CN, and, as illustrates in FIG. 11, may include generating image information CI by accumulating emission results for the corner area CN (S10), generating identification information by extracting an area corresponding to a predetermined reference area from the image information CI (S20), detecting presence or absence of an obstacle in the corner area CN based on a result of comparing the identification information with pre-stored reference information (S30), and traveling in the corner area CN according to a result of the detection (S40).

Such a traveling method may be a traveling method executed in a traveling mode in which the robot 100 travels in the corner area CN.

The step (S10) of generating the image information CI may be a step in which the robot 100 generates the image information CI for the corner area CN by accumulating the emission results.

In the step (S10) of generating the image information CI, the image information CI may be generated by accumulating the emission results according to a predetermined criterion.

In the step (S10) of generating the image information CI, the image information CI may be generated, as illustrated in FIG. 8, by accumulating the emission results according to the predetermined criterion.

The step (S20) of generating the identification information may be a step in which the robot 100 generates the identification information from the image information CI after generating the image information CI (S10).

In the step (S20) of generating the identification information, the identification information may be generated by extracting an area with predetermined upper and lower lengths from one point of the image information CI.

In the step (S20) of generating the identification information, the identification information may be generated by extracting the area corresponding to the reference area from the image information CI and reducing a size of the extracted area according to a predetermined ratio.

The step (S30) of detecting the presence or absence of the obstacle OB in the corner area CN may be a step in which the robot 100 compares the identification information with the reference information and detects the presence or absence of the obstacle OB in the corner area CN according to a result of the comparison.

In the step (S30) of detecting the presence or absence of the obstacle OB in the corner area CN, the identification information may be compared with at least one pattern of topography, feature, and type of obstacle OB in the corner area CN included in the reference information, and the presence or absence of the obstacle OB in the corner area may be detected according to a pattern corresponding to the identification information among the patterns included in the reference information.

In the step (S30) of detecting the presence or absence of the obstacle OB in the corner area CN, the identification information may be compared with the reference information, and the presence or absence of the obstacle OB may be detected by distinguishing the topography, feature, and type of the obstacle OB in the corner area.

The step (S40) of traveling in the corner area CN may be a step in which the robot 100 travels in the corner area CN according to a result of the detection after detecting the presence or absence of the obstacle OB.

In the step (S40) of traveling in the corner area CN, when detecting the presence of the obstacle Oft the robot 100 may turn its traveling direction to a direction before performing the turning motion, and then move forward in a direction toward the one wall WALL, thereby traveling without a collision with the obstacle OB.

The traveling method including generating the image information CI (S10), generating the identification information (S20), detecting the presence or absence of the obstacle OB in the corner area CN (S30), and traveling in the corner area (S40) may be implemented as a computer-readable code on a medium in which a program is recorded. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the control unit 1800.

The implementations of the moving robot and the traveling method thereof in the corner areas may be practiced independently or separately, and one or more implementations may be combined and practiced. In addition, other implementations of a moving robot and a traveling method thereof in corner areas may be combined with the aforementioned implementations.

The implementations of the moving robot and the traveling method thereof in the corner areas may be applied to a robot cleaner, a control mechanism for controlling the robot cleaner, a robot cleaning system, a method for controlling the robot cleaner, and the like. However, the technology disclosed herein may not be limited thereto, and may be applied to a moving robot, a moving robot system, and a control method of a moving robot to which the technical idea of the technology can be applied.

The foregoing detailed implementations have been described, but various modifications may be made without departing from the scope of the present disclosure. Therefore, the scope of the present disclosure should not be limited to the aforementioned implementations, and should be defined by the claims and equivalents thereof.

As described above, although the present disclosure has been described by those limited implementations and drawings, the present disclosure may not be limited to the above implementations, but be modified and varied in various manners by a person skilled in the field to which the present disclosure belongs. Therefore, the scope of the present disclosure should be construed only by those claims set forth blow, and all of equivalents or variations will belong to the scope of the present disclosure.

What is claimed is:

1. A moving robot comprising:
    a main body;
    a driving unit configured to move the main body;
    a sensing unit configured to emit sensing light for detecting whether or not an obstacle exists at a front of the main body, so as to generate an emission result; and
    a control unit configured to detect whether or not an obstacle exists in a traveling environment of the main body based on the emission result of the sensing unit, so as to control traveling of the main body according to a result of the detection,
    wherein the sensing unit comprises a three-dimensional (3D) camera sensor to emit the sensing light to the front of the main body,
    wherein the three-dimensional camera sensor is provided to face the ground in front of the main body and to emit the sensing light onto the ground in a form of line beam,
    wherein the control unit, when controlling the traveling in a corner area within the traveling environment, generates identification information by extracting an area corresponding to a predesignated reference area from image information in which the emission results for the corner area are accumulated, detects whether or not the obstacle exists in the corner area based on a result of comparing the identification information with prestored reference information, and controls the main body to travel in the corner area according to a result of the detection,
    wherein the control unit detects whether or not the obstacle exists in the corner area based on a result of accumulating the emission result of the sensing unit according to a predetermined criterion,
    wherein the predetermined criterion is a criterion of the image information for identifying information on the corner area, and
    wherein the predetermined criterion is a criterion for a volume of the image information, an emission time of the sensing unit, or an amount of data required for the emission result.

2. The moving robot of claim 1, wherein the control unit, when controlling the traveling in the corner area, controls the main body to travel in the corner area according to a preset traveling mode.

3. The moving robot of claim 2, wherein the traveling mode is a mode in which the main body sequentially moves backward, turns, curvedly travels, and moves forward with respect to one wall of the corner area.

4. The moving robot of claim 3, wherein the control unit generates the identification information while the main body performs the turn and the curved-travel, and detects whether or not the obstacle exists in the corner area based on a result of comparing the identification information with the reference information.

5. The moving robot of claim 3, wherein the control unit, when detecting an obstacle in the corner area, controls the main body to turn to a direction before performing the turn and move forward in a direction toward the one wall of the corner area.

6. The moving robot of claim 1, wherein the reference area is an area corresponding to predetermined upper and lower lengths from one point of the image information.

7. The moving robot of claim 6, wherein the one point of the image information is a point at which a ratio that the sensing light is gathered is a predetermined reference or higher.

8. The moving robot of claim 1, wherein the control unit extracts the area corresponding to the reference area from the image information, and generates the identification information by reducing a size of a result of the extraction according to a predetermined ratio.

9. The moving robot of claim 1, wherein the reference information includes at least one pattern information related to topography, feature, and obstacle type in the corner area.

10. The moving robot of claim 9, wherein the control unit compares the identification information with the reference information, and detects whether or not an obstacle exists in the corner area according to a pattern corresponding to the identification information among the at least one pattern information included in the reference information.

11. The moving robot of claim 10, wherein the control unit compares the identification information with the reference information, and detects whether or not an obstacle exists in the corner area by distinguishing the topography, feature, and obstacle type in the corner area.

12. The moving robot of claim 1, wherein the control unit reflects the result of detecting whether or not the obstacle exists in the corner area to the reference information so as to store the reference information.

13. A method for traveling in a corner area, performed by a moving robot comprising a main body, a driving unit configured to move the main body, a sensing unit configured to emit sensing light for detecting whether or not an obstacle exists at a front of the main body so as to generate an emission result, and a control unit configured to detect whether or not an obstacle exists in a traveling environment of the main body based on the emission result of the sensing unit, so as to control the traveling of the main body according to a result of the detection, the method comprising:

generating image information by accumulating the emission results for the corner area;

generating identification information by extracting an area corresponding to a predesignated reference area from the image information;

detecting whether or not an obstacle exists in the corner area based on a result of comparing the identification information with pre-stored reference information; and traveling in the corner area in response to a result of the detection, wherein the sensing unit comprises a three-dimensional (3D) camera sensor to emit the sensing light to the front of the main body, wherein the three-dimensional camera sensor is provided to face the ground in front of the main body to emit the sensing light onto the ground in a form of line beam, wherein the generating the image information is configured to generate the image information by accumulating the emission results of the sensing unit according to a predetermined criterion, wherein the predetermined criterion is a criterion of the image information for identifying information on the corner area, and wherein the predetermined criterion is a criterion for a volume of the image information, an emission time of the sensing unit, or an amount of data required for the emission result.

14. The method of claim 13, wherein the generating the identification information is configured to generate the identification information by extracting an area corresponding to predetermined upper and lower lengths from one point of the image information.

15. The method of claim 14, wherein the generating the identification information is configured to extract an area corresponding to the reference area from the image information, and generate the identification information by reducing a size of a result of the extraction according to a predetermined ratio.

16. The method of claim 13, when the detecting whether or not the obstacle exists in the corner area is configured to compare the identification information with at least one pattern of topography, feature, and obstacle type in the corner area included in the reference information, and detect whether or not the obstacle exists in the corner area according to a pattern corresponding to the identification information among the at least one pattern included in the reference information.

17. The method of claim 16, when the detecting whether or not the obstacle exists in the corner area is configured to compare the identification information with the reference information, and detect whether or not the obstacle exists in the corner area by distinguishing the topography, feature, and obstacle type in the corner area.

* * * * *